United States Patent
Ma et al.

(10) Patent No.: US 9,805,741 B1
(45) Date of Patent: Oct. 31, 2017

(54) WRITE CURRENT PARAMETER SELECTION FOR MAGNETIC RECORDING

(71) Applicant: Seagate Technology LLC, Cupertino, CA (US)

(72) Inventors: Minjie Ma, Bloomington, MN (US); Steven Granz, Shakopee, MN (US); Kaizhong Gao, North Oaks, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/417,661

(22) Filed: Jan. 27, 2017

Related U.S. Application Data

(60) Provisional application No. 62/335,923, filed on May 13, 2016, provisional application No. 62/288,726, filed on Jan. 29, 2016.

(51) Int. Cl.
  *G11B 20/12* (2006.01)
  *G11B 5/09* (2006.01)
  *G11B 5/012* (2006.01)
  *G11B 5/00* (2006.01)

(52) U.S. Cl.
  CPC ............... *G11B 5/09* (2013.01); *G11B 5/012* (2013.01); *G11B 2005/0021* (2013.01)

(58) Field of Classification Search
  None
  See application file for complete search history.

(56) References Cited

U.S. PATENT DOCUMENTS

| | | | |
|---|---|---|---|
| 4,030,130 A | 6/1977 | Smith | |
| 4,152,736 A | 5/1979 | Jansen et al. | |
| 4,298,897 A | 11/1981 | Arter et al. | |
| 4,535,372 A | 8/1985 | Yeakley | |
| 4,622,601 A | 11/1986 | Isozaki et al. | |
| 4,646,168 A | 2/1987 | Sonobe et al. | |
| 4,771,346 A | 9/1988 | Shoji et al. | |
| 4,803,571 A | 2/1989 | Fujioka et al. | |
| 4,853,799 A | 8/1989 | Aikawa | |
| 5,010,430 A | 4/1991 | Yamada et al. | |
| 5,285,341 A | 2/1994 | Suzuki et al. | |
| 5,402,270 A | 3/1995 | McDonnell et al. | |
| 5,760,993 A | 6/1998 | Purkett | |
| 5,892,634 A | 4/1999 | Ito et al. | |
| 5,978,168 A | 11/1999 | Mathews et al. | |
| 6,052,797 A | 4/2000 | Ofek et al. | |
| 6,104,562 A | 8/2000 | Ottesen et al. | |
| 6,185,063 B1 | 2/2001 | Cameron | |
| 6,710,960 B1 | 3/2004 | Yorimitsu | |
| 6,768,605 B2 | 7/2004 | Yamamoto | |
| 7,130,152 B1 | 10/2006 | Raymond et al. | |

(Continued)

FOREIGN PATENT DOCUMENTS

EP 484774 A2 5/1992
EP 1564736 A2 8/2005

(Continued)

*Primary Examiner* — K. Wong
(74) *Attorney, Agent, or Firm* — Holzer Patel Drennan

(57) ABSTRACT

A storage device includes a storage medium and a storage device controller that selectively varies a value of at least one write current parameter to generate alternating data tracks of variable written track width. According to one implementation, the alternating data tracks of variable written track width are generated with a single writer.

20 Claims, 7 Drawing Sheets

(56) References Cited

U.S. PATENT DOCUMENTS

| | | |
|---|---|---|
| 7,259,927 B2 | 8/2007 | Harris |
| 7,393,066 B2 | 7/2008 | Dugas et al. |
| 7,440,222 B2 | 10/2008 | Nakamura et al. |
| 7,508,619 B2 | 3/2009 | Okamoto et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,139,318 B2 | 3/2012 | Biskeborn |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,232 B2 | 9/2015 | Edelman et al. |
| 9,142,246 B1 | 9/2015 | Trantham et al. |
| 9,153,287 B1 | 10/2015 | Hamilton et al. |
| 9,324,362 B1 | 4/2016 | Gao |
| 9,396,062 B1 | 7/2016 | Sridhara et al. |
| 9,418,688 B1 | 8/2016 | Rausch et al. |
| 9,601,154 B2 * | 3/2017 | Zhu .................. G11B 20/1217 |
| 9,607,631 B2 * | 3/2017 | Rausch .................. G11B 5/09 |
| 9,633,675 B2 * | 4/2017 | Zhu .......................... G11B 5/09 |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2014/0285923 A1 | 9/2014 | Aoki et al. |
| 2014/0327983 A1 | 11/2014 | Biskeborn et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | |
|---|---|---|
| JP | H02-240862 A2 | 9/1990 |
| WO | 2005-030869 A1 | 4/2005 |

\* cited by examiner

WRITE CURRENT PARAMETER SELECTION FOR MAGNETIC RECORDING

PRIORITY CLAIM

The present application claims priority to U.S. Patent Application Ser. No. 62/288,726 filed Jan. 29, 2016, and titled "Single Writer Interlaced Magnetic Recording", and U.S. Patent Application Ser. No. 62/335,923 filed May 13, 2016, and titled "Write Current Parameter Selection For Magnetic Recording", which are hereby incorporated by reference for all that they disclose or teach.

BACKGROUND

As requirements for data storage density increase for magnetic media, cell size decreases. A commensurate decrease in the size of a writer is difficult because, in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is interlaced magnetic recording (IMR).

IMR utilizes alternating data tracks of different written track widths arranged with slightly overlapping edges so that a center-to-center distance between directly adjacent tracks (e.g., the track pitch) is uniform across the surface of the magnetic medium. In some heat-assisted magnetic recording applications, tracks of different write widths are created by varying laser power. However, prolonged usage of a laser at high power levels can significantly shorten the functional lifetime of a laser. In some perpendicular magnetic recording applications, variable track widths are created by two writers of different size on a same transducer head. However, manufacturing processes for multi-writer heads is inherently more complex than manufacturing processes for single-writer transducer heads.

BRIEF DESCRIPTIONS OF THE DRAWINGS

SUMMARY

Implementations disclosed herein provide a storage device including a storage medium and a storage device controller that selectively varies a value of at least one write current parameter to generate alternating data tracks of variable written track width on the storage medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
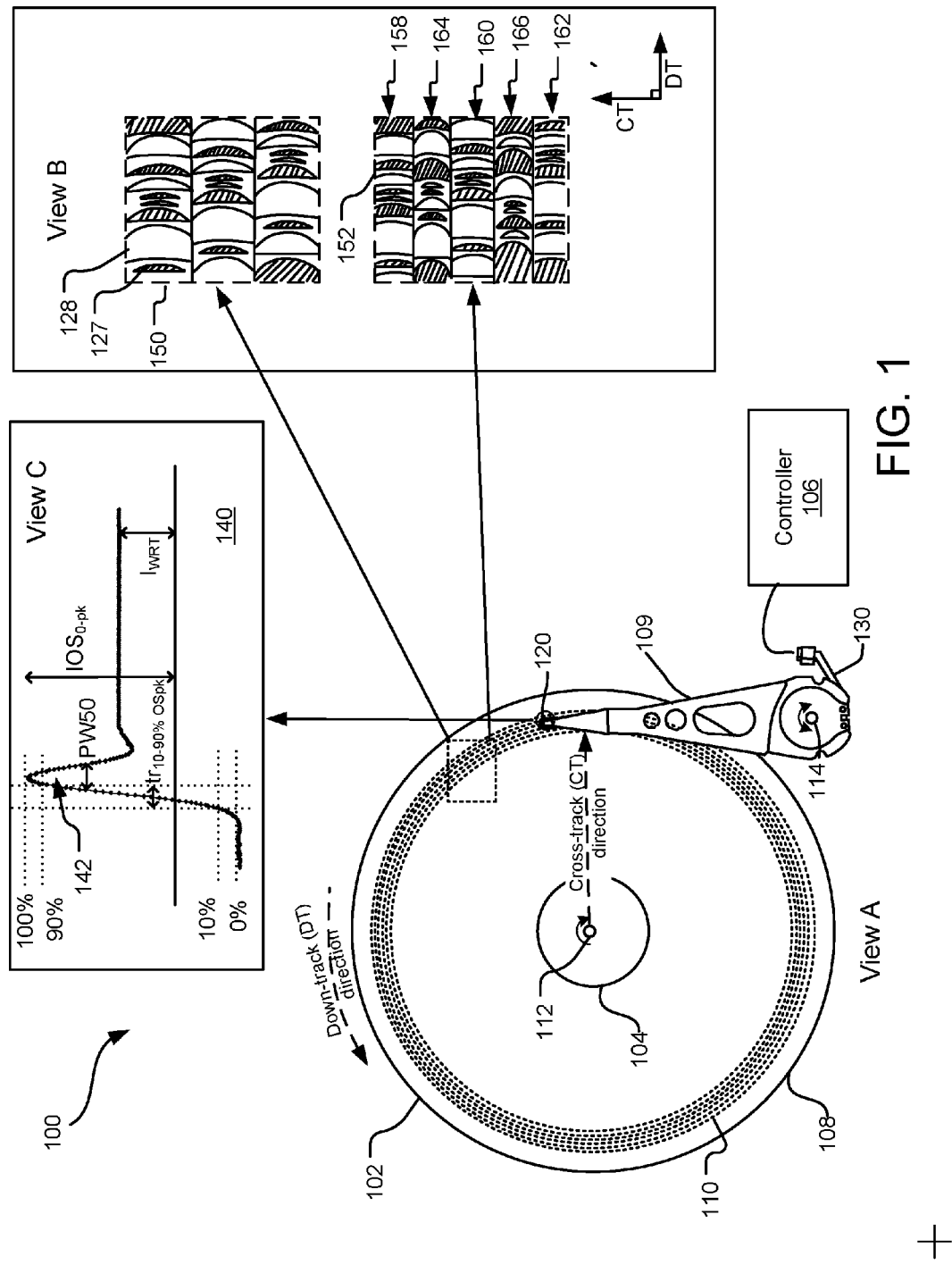
FIG. 1 illustrates an example data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114 and flies in close proximity above the surface of the storage medium 108 during disc rotation. The actuator assembly 109 rotates during a seek operation about the actuator axis of rotation 112 to position the transducer head assembly 120 over a target data track for each read and write operation.

The transducer head assembly 120 includes a writer (not shown) further including a write pole for converting a series of electrical pulses sent from a controller 106 into a series of magnetic pulses of commensurate magnitude and length. The magnetic pulses of the write pole selectively magnetize magnetic grains of the rotating magnetic media 108 as they pass below the pulsating writer.

View B illustrates magnified views 150 and 152 of a same surface portion of the storage media 108 according to different write methodologies. Specifically, the magnified views 150 and 152 include a number of magnetically polarized regions, also referred to herein as "data bits," along the data tracks of the storage media 108. Each of the data bits (e.g., a data bit 128) represents one or more individual data bits of a same state (e.g., 1s or 0s). For example, the data bit 128 is a magnetically polarized region representing multiple bits of a first state (e.g., "000"), while an adjacent data bit 127 is an oppositely polarized region representing one or more bits of a second state (e.g., a single "1"). The data bits in each of the magnified views 150 and 152 are not necessarily illustrative of the actual shapes or separations of the bits within an individual system configuration.

The magnified view 150 illustrates magnetic transitions recorded according to a conventional magnetic recording (CMR) technique. Under CMR, all written data tracks are randomly writeable and have substantially equal written track width. "Written track width" refers to, for example, a width measured in a cross-track direction of a recorded data bit. Each of the individual data tracks is randomly writeable, which means that the data tracks can each be individually re-written multiple times without significantly degrading data on other adjacent data tracks. With CMR, a maximum attainable areal storage density (ADC) is reduced as compared to an interlaced magnetic recording (IMR) technique illustrated in magnified view 152.

IMR utilizes alternating data tracks of different written track widths arranged with slightly overlapping edges so that a center-to-center distance between directly adjacent tracks (e.g., the track pitch) is uniform across the surface of the magnetic medium 108. For example, the IMR technique shown in the magnified view 152 illustrates alternating data tracks of two different written track widths. A first series of alternating tracks (e.g., tracks 158, 160, and 162) have a wider written track width than a second series of interlaced data tracks (e.g., 164 and 166). Each wide data track of the first series (e.g., the data track 160) is written before the narrow and directly adjacent data tracks of the second series (e.g., the data tracks 164 and 166). For example, the data track 160 is written before the data tracks 164 and 166. The write to data tracks 164 and 166 overwrites outer edge portions of the data track 160; however, the data track 160 is still readable.

Because each data track of wide written width is written prior to a data write of the directly adjacent data tracks of narrower written width, the data tracks of the wider written width (e.g., data tracks 158, 160, and 162) are also referred to herein as IMR bottom tracks, while the alternating data tracks of narrower written width (e.g., the data tracks 164 and 166) are referred to herein as "IMR top tracks." According to one implementation, the IMR top tracks are of a lower linear density (e.g., kilobytes per inch, measured in the down-track direction) than the IMR bottom tracks. Other IMR implementations utilize interlaced data tracks having more than two different linear densities and/or written track widths. By manipulating the linear densities of the top and bottom data tracks and/or manipulating an order in which the data tracks are written, IMR systems can be tuned to exhibit a number of characteristics superior to CMR systems, such as increased ADC and system performance.

According to one implementation of the disclosed technology, a single writer is utilized to create the IMR effect illustrated by the magnified view of 152. Specifically, the effect of variable written track widths is created by generating write current for the IMR top tracks and IMR bottom tracks according to different write current parameters. As used herein, write current parameters are parameters affecting the shape of each electrical current pulse provided to a write coil of the writer on the transducer head 120. By example and not limitation, View C illustrates a write current pulse 140 that a controller 106 provides to the writer to write data to the storage medium 108. The writer translates the write current pulse 140 into a magnetic pulse of corresponding magnitude, which in turn polarizes one or more of the magnetic bits on the storage medium 108.

The write current pulse 140 is characterized by a number of write current parameters that can be selectively varied to affect a written track width. One of these write current parameters is steady state write current amplitude ($I_{WRT}$), or the base amplitude of each write current pulse excluding an overshoot portion 142 included at the beginning of the write current pulse 140. Another of the write current parameters is overshoot amplitude ($IOS_{0-pk}$), or a positive amplitude maximum of the overshoot portion 142 of the write current pulse 140. Still another write current parameter is overshoot duration (PW50), which refers to the width of the overshoot portion 142 at 50% of the pulse amplitude (full width at half maximum or PW50). A fourth write current parameter is rise time ($tr_{10-90\%OSpk}$) or the time that it takes for the write current pulse 140 to initially rise between 10% and 90% of the maximum value of the overshoot portion 142. In various implementations, write current parameters may be differently defined to similarly describe shape characteristics of the write current pulse 140.

The controller 106 writes the bottom data tracks 158, 160, and 162 according to a first set of write current parameter values and writes the top data tracks 164, 166 according to a second set of write current parameter values. In this context, the first set of write current parameter values includes at least one write current value that is different from a corresponding value of the second set of write current parameter values.

In one implementation, the IMR bottom tracks 158, 160, and 162 and IMR top tracks 164, 166 are written according to a same, fixed overshoot amplitude and same, fixed overshoot duration but with different steady state write currents (e.g., a higher steady state write current for the IMR bottom data tracks 158, 160, and 162 than for the top data tracks 164, 166). In another implementation, two or more write current values are jointly optimized such that the first set of values for the IMR bottom data tracks 158, 160, and 162 includes two or more values different than those included in the set of values for the IMR top data tracks 164 and 166. Together, the steady state write current ($I_{WRT}$), overshoot amplitude ($IOS_{0-pk}$), and overshoot duration (PW50) are sometimes referred as "write triplet parameters." In some implementations, the write triplet parameters are jointly optimized and selected for best ADC and system performance yields. In other implementations, different combinations of write current parameters (e.g., including fewer or greater than three total write current parameters) are jointly or independently optimized to create different written track widths, as shown in magnified view 152. By writing the IMR bottom tracks 158, 160, and 162 according to a different set of write current parameters than the IMR top tracks 164, 166, etc., an increased in ADC can be attained without the consequential drawbacks of other current IMR solutions, such as excessive wear on a HAMR laser.

Figure 2:
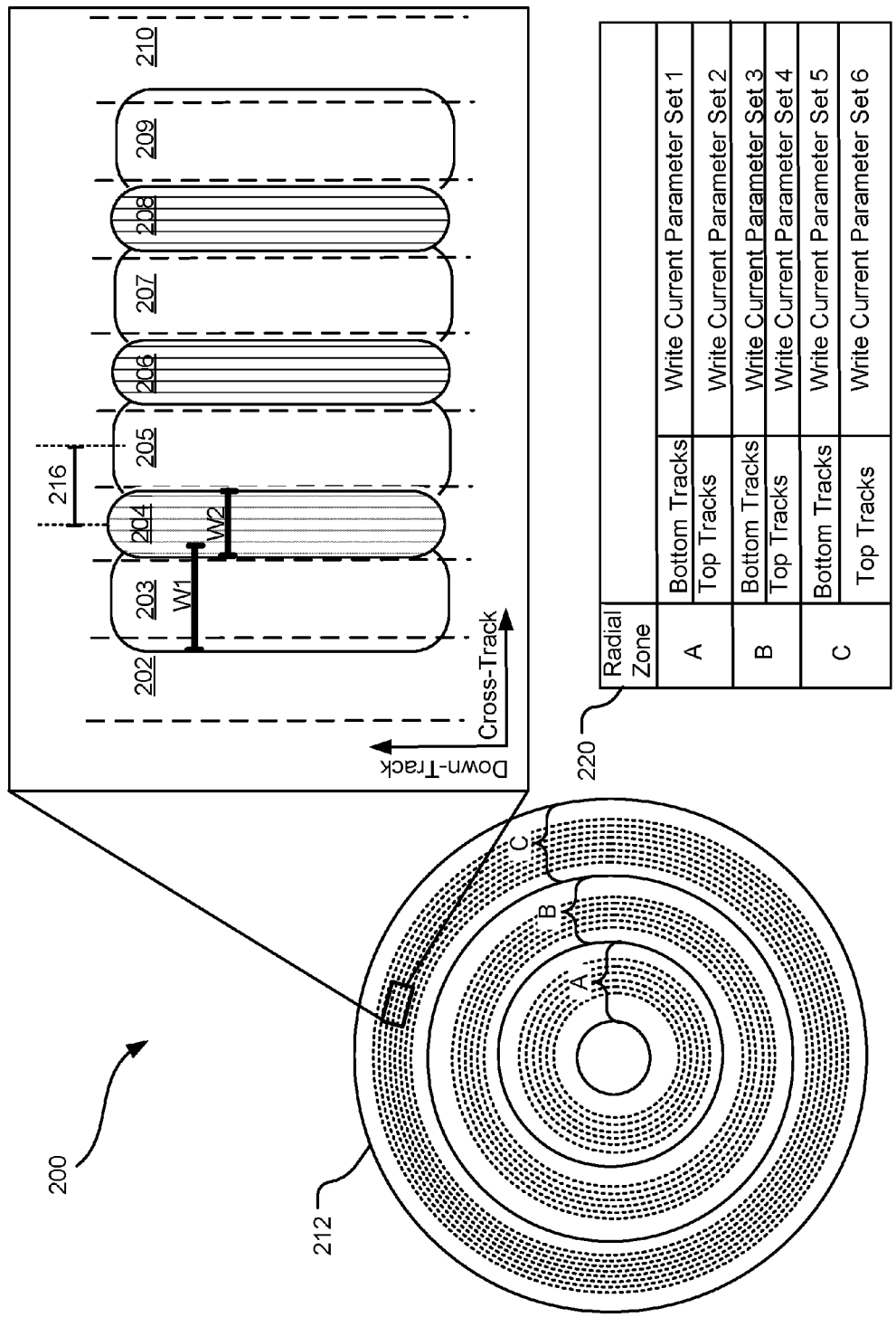
FIG. 2 illustrates an example storage system that implements an interlaced magnetic recording (IMR) data management scheme by varying write current parameter values when writing to alternating data tracks on a storage medium.

FIG. 2 illustrates an example storage system 200 that implements an IMR recording technique by varying write current parameters when writing to alternating data tracks on a storage medium 212. The storage medium 212 is shown divided into different radial zones A, B, and C, but other implementations may include greater than three radial zones. As illustrated in expanded view 220, each radial zone is divided into data tracks of a substantially equal track pitch 216 (e.g., a center-to-center distance between adjacent tracks). A first set of alternating data tracks within each zone comprise the IMR bottom tracks (e.g., IMR bottom tracks 203, 205, 207, and 209), while a second set of alternating data tracks in each zone comprise the IMR top tracks (e.g., IMR top tracks 204, 206, 208).

During storage operations, the bottom data tracks are written to have a wider written track width W1 than the top data tracks with a narrower width W2. Phrased differently, a write to one of the IMR bottom tracks magnetizes a larger surface area on the storage medium 212 than a data write to one of the IMR top tracks. In one implementation, each of the IMR bottom tracks 203, 205, 207, and 209 receives data before any data is written to the two immediately adjacent IMR top tracks (e.g., 204, 206, or 208). For example, the IMR bottom track 205 is written before any data is written to the directly adjacent IMR top tracks 204 and 206.

During a factory formatting process, a zone table 220 is populated and stored in memory accessible by the storage device 200. For each of the radial zones A, B, and C, the zone table 220 stores a first set of write current parameters in association with the IMR bottom tracks of the zone and a second set of write current parameters in association with the IMR top tracks of the zone. Within any one radial zone (A, B, or C), the set of write current parameters for the IMR bottom tracks is different than for the IMR top tracks. Each write current parameter set (e.g., 'write current parameter set 1') may include, for example, a specified steady state current value, an overshoot amplitude value, an overshoot duration value, a rise time value, etc. When writing data to a target data track, a controller of the storage system 200 retrieves values for write current parameters stored in the zone table 220 in association with the target data track.

In one implementation, the storage system 200 includes a single writer than writes both IMR top tracks and IMR bottom tracks in each of the radial zones. In another implementation, two writers of different sizes are used to execute data writes according to the write current parameters of the zone table 220. For example, a first writer with a wide write pole may write to the IMR bottom track 205 in radial zone A according to one write current parameter set and a second writer with a narrower write pole writes to the IMR top tracks 204 and 206 in the radial zone A according to a different write current parameter set.

Figure 3:
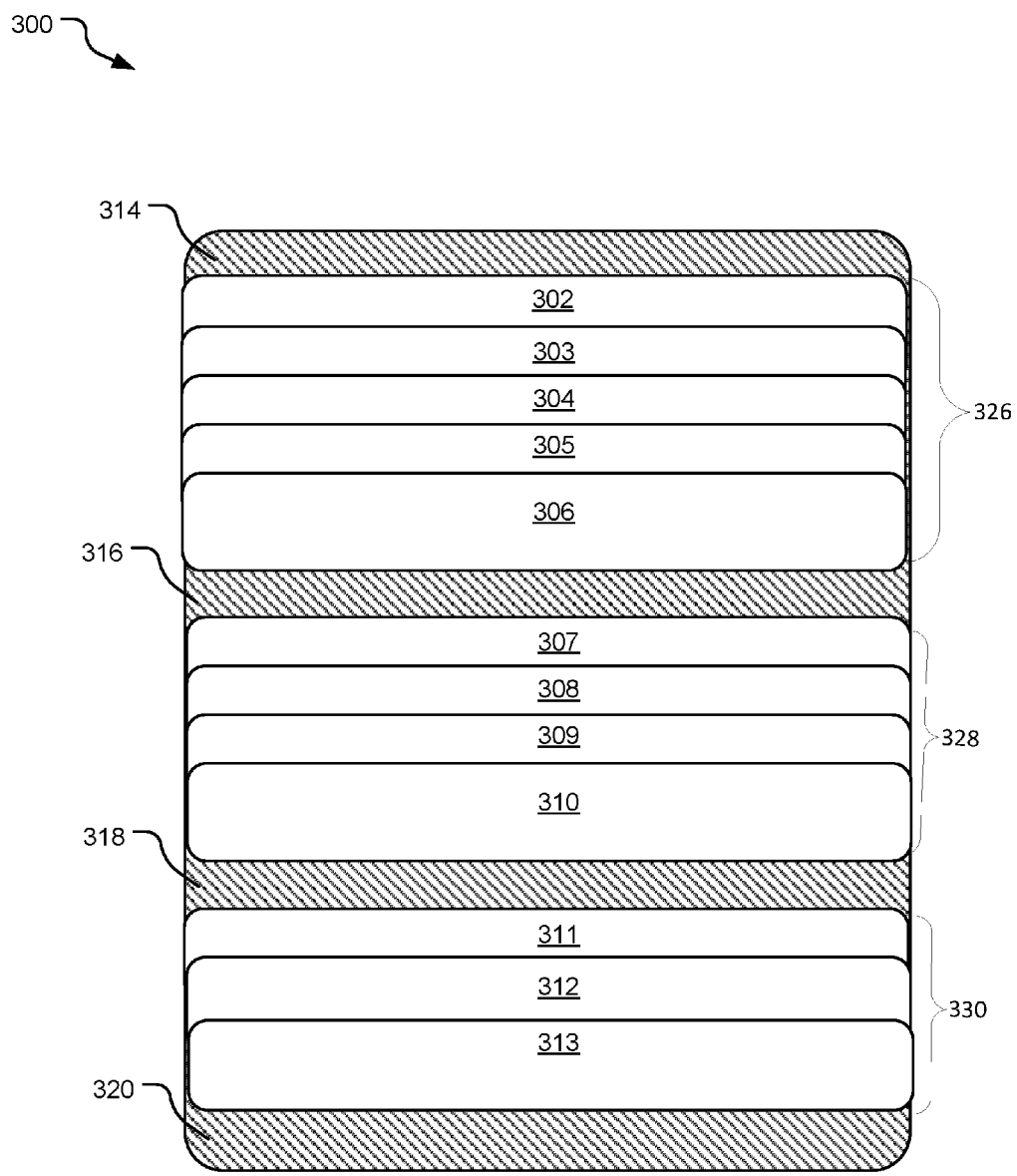
FIG. 3 illustrates an example storage system that implements a shingled magnetic recording (SMR) data management scheme by varying write current parameter values when writing to alternating data tracks on a storage medium.

FIG. 3 illustrates an example storage medium 300 that implements a shingled magnetic recording (SMR) recording technique by varying write current parameters when writing to alternating data tracks. In SMR systems, a magnetic field produced by the writer is strong enough to affect two adjacent data tracks on the magnetic storage medium 300 on a single pass of the writer. In other words, a magnetic footprint (e.g., an area of the storage medium magnetically polarized by the writer on a single pass) may be defined to correspond to two different data tracks on the magnetic storage medium 300. For example, an initial write to the data track 302 incidentally magnetizes (e.g., corrupts) data on the adjacent data track 303. The corrupted data in the data track 303 can be corrected on a subsequent pass of the writer over the data track 303, but this data write to the data track 303 in turn corrupts data on data track 304, and so on.

To manage data in this SMR system despite the above-described track overlap, data tracks on the data storage device 300 are managed in groups referred to as data bands that are each separated from one another one or more guard tracks where no data is stored. For example, the storage medium 300 includes a data band 326 including data tracks 302-306, a data band 328 including data tracks 307-310, and a data band 330 including data tracks 311-313. The data bands are separated from one another by guard tracks 314, 316, 318, and 320.

In an example write operation of the data track 306, a storage device controller reads all data tracks in the associated data band 326 (e.g., including data tracks 302-306) into a memory location in a consecutive order. In memory, the storage device controller updates the one or more data cells to be changed by the write operation and then re-writes, in a consecutive track order, the data tracks 302, 303, 304, 305, and 306 including the one or more updated cells.

In one implementation, each of the shingled data bands 326, 328, and 330 is associated with a defined radial zone. During a factory formatting process, a zone table (not shown) is populated and stored in memory accessible by the storage device controller. For each defined zone, the zone table stores a first set of write current parameters in association with a first set of alternating SMR data tracks and a second set of write current parameters in association with a second set of write current parameters. Each set write current parameters may include, for example, a specified steady state current value, an overshoot amplitude value, an overshoot duration value, a rise time value, etc.

When writing data to a target data track within a particular data band, a controller of the storage system 300 retrieves values for write current parameters stored in the zone table 320 in association with the target data track. Alternating data tracks in a same radial zone may be written according to two different sets of write current parameters. For example, the data tracks 302, 304, and 306 may be written according to a first set of write current parameters while the data tracks 303 and 305 may be written according to a second set of write current parameters. The write current parameter selection may be such as to generate alternating tracks of variable width within the SMR write scheme, such as according to principles similar to those shown and described with respect to the IMR write scheme of FIGS. 1-2. If, for example, write current parameters are selected to make odd-numbered tracks 303 and 305 narrower than the data tracks 302, 304, and 306, then the spacing between tracks can be adjusted to increase the track density (e.g., total number of data tracks) of the storage medium 300. This concept is show and described in greater detail with respect to FIG. 4, below.

Figure 4:
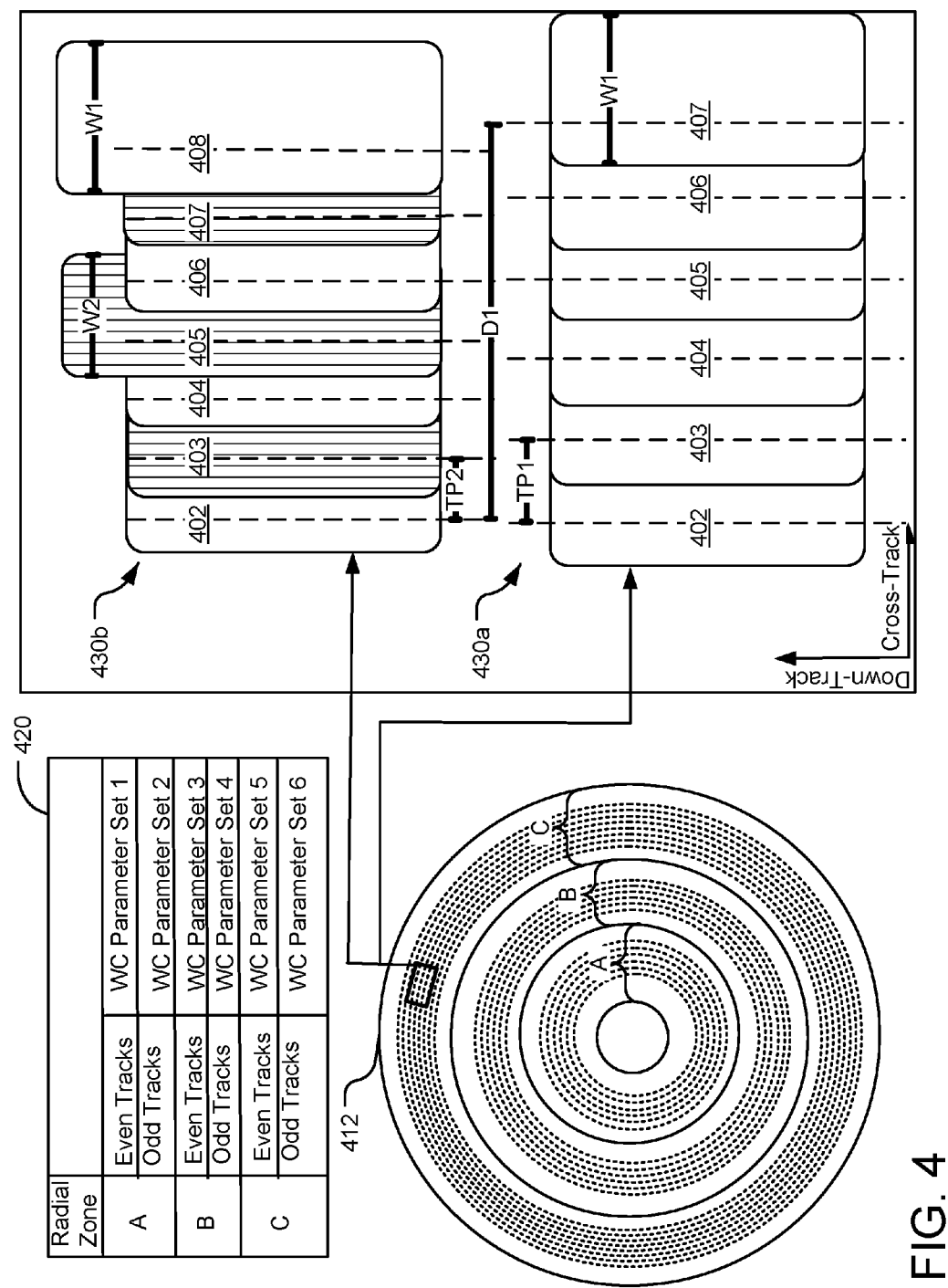
FIG. 4 illustrates another example storage system that implements an SMR recording technique by varying write current parameters when writing to alternating data tracks on a storage medium.

FIG. 4 illustrates another example storage system 400 that implements an SMR recording technique by varying write current parameters when writing to alternating data tracks on a storage medium 412. The storage medium 412 is shown divided into different radial zones A, B, and C, but other implementations may include greater than three radial zones. During a factory formatting process, a zone table 420 is populated and stored in memory accessible by a controller of the storage system 400. Expanded views 430a and 430b each illustrate SMR data bands of variable track density according to two different write techniques. In each of these expanded views 430a and 430b, the illustrated SMR data bands are divided into data tracks of a substantially equal track pitch (e.g., a center-to-center distance between adjacent tracks).

In the expanded view 430a, each data track in the illustrated SMR data band is written according to a same set of write current parameters. These data tracks (e.g., 402, 403, 404, 405, 406, and 407) are evenly spaced and evenly overlapped to provide a uniform track pitch TP1 (e.g., center-to-center distance between adjacent tracks) across all tracks shown. These tracks are each written with a common set of write current parameters and therefore each are initially written with an equal written track width (W1), where W1 represents a radial width of area on the storage medium 412 that is magnetically affected by a pass of a writer. The final data track in the data band (e.g., data track 407) appears wider than the other tracks because it is not overlapped by any subsequently-written write track.

In contrast, expanded view 430b illustrates a different technique that permits an increase in track density without a corresponding increase in bit error rate. Specifically, the view 430b illustrates a data band included seven data tracks that are shown to occupy approximately the same radial width of storage (D1) on the storage medium 412 as the six data tracks shown according to the write technique of view 430a. The final data track in the data band (e.g., data tracks 408) appears wider than the other tracks because it is not overlapped by any subsequently-written data track.

In expanded view 430b, the seven tracks are written according to a uniform second track pitch TP2 and according to two different sets of write track parameters to provide two alternating write widths—W1 and W2. For example, even tracks in a radial zone are written according to a first write current parameter set and odd tracks in the radial zone are written according to a second write current parameter set, as shown in the zone table 420. During storage operations, a first set of alternating data tracks (e.g., 402, 404, 406, and 408) are written to have a wider written track width W1 than a second set of interlaced alternating data tracks (e.g., 403, 405, and 407), while the interlaced alternating data track 403, 405, and 407 are written to have a narrower written track width W2. A degree of overlap is variably set (e.g., differently for the tracks of the first width W1 than the second width W2) to ensure that the track pitch TP2 (e.g., center-to-center distance between each pair of adjacent tracks) remains constant for all tracks shown. The track pitch TP2 of the view 430b is set to be less than the track pitch TP1 illustrated with respect to the view 430a. As a result of these alternating data tracks of different written widths W1 and W2 and varying degrees of overlap to create the track pitch TP2, a track density of the view 430b is greater than the view 430a.

Notably, the illustrated relative track spacings shown in the views 430a and 430b are exemplary and not necessarily representative of actual proportions.

Figure 5:
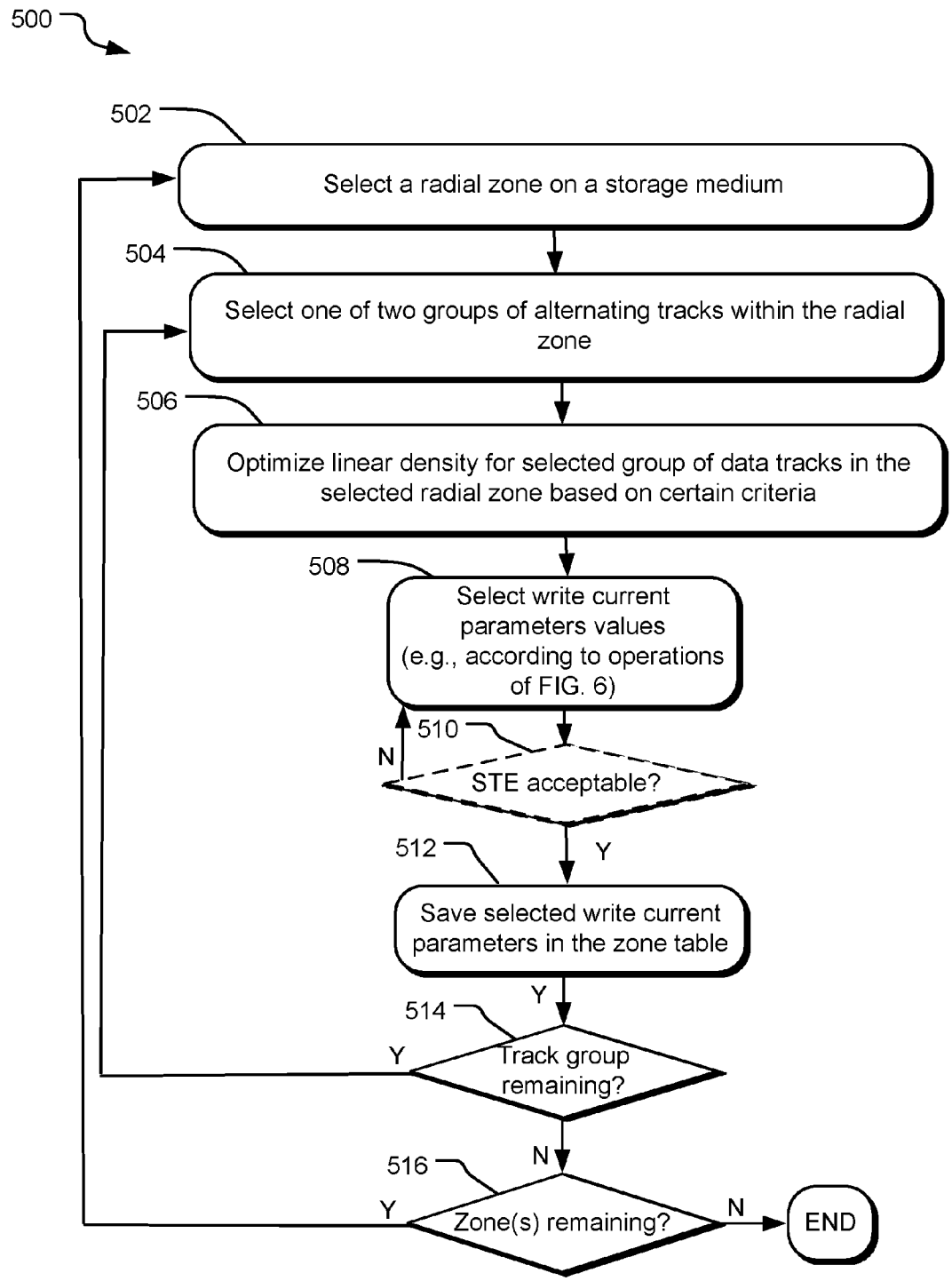
FIG. 5 illustrates example operations for populating a zone table with write current parameter values to implement an IMR data management scheme.

FIG. 5 illustrates example operations 500 for populating a zone table of a storage device with write current parameter values to implement an IMR data management scheme. In one implementation, the zone table associates different sets of write current parameter values with alternating tracks on a storage medium. Write current parameter values may further vary based on radial zone.

During a factory manufacturing or formatting process, the zone table is populated with the write current parameter values for use when writing data to various tracks within each of the radial zones. Specifically, the zone table stores two sets of write current parameter values in association with each radial zone—a first set of write current parameter values for writing to a first set of alternating data tracks (e.g., IMR bottom tracks or SMR even-numbered tracks) and a second set of write current parameter values for writing to a second set of alternating tracks interlaced with the first set of alternating tracks (e.g., IMR top tracks or SMR odd-numbered tracks).

To initially populate the zone table, a selection operation 502 selects a radial zone on the storage medium and another selection operation 504 selects a group of data tracks within the zone for a write parameter optimization process. In one implementation, the selection operation 504 initially selects a series of tracks that will be the IMR bottom tracks when the storage device is used by an end consumer. A linear density optimization operation 506 selects a linear density for data writes to the selected group of data tracks according to certain predefined criteria. In various implementations, the linear density optimization operation 506 may be performed differently; however, in one implementation when the selected data tracks are to become IMR bottom tracks, the linear density is initially selected to be as high as possible and systematically reduced such that the on-track bit-error rate (BER) of any individual data track is within an acceptable error margin, such as 0.3 dcd, after data is written to each track and the two immediately adjacent data tracks.

A write current parameter selection operation 508 selects the actual write current parameter values to be used during normal device operation when writing data to the selected zone and selected group of tracks. In one implementation, the write current parameter selection operation 508 is performed via a series of operations discussed in detail with respect to FIG. 6, below. In one example write current parameter selection operation, write current parameter values are systematically varied in one or more dimensions while repeated data writes are performed and write error statistics are observed. Examples of write error statistics include without limitation bit error rate (BER), sector failure rate, code word failure rate, or read back signal amplitude. The selected write current parameter values include values for one or more of a steady state write current value, an overshoot amplitude value, an overshoot duration value, and a rise time value.

After the optimized write current parameter values are selected via the selection operations 508, a side track erasure (STE) measurement and assessment operation 510 measures STE that occurs when data is written to the selected data tracks at the selected write current parameter values. Since STE does not occur in heat-assisted magnetic recording (HAMR) devices, the STE measurement and assessment operation 510 is not performed (e.g., is skipped over in the FIG. 5 flowchart) when populating zone tables in HAMR devices.

For non-HAMR devices (e.g., a perpendicular magnetic recording device), the STE measurement and assessment operation 510 measures and assesses acceptability of STE that is observed during a data write to the selected group of tracks at the selected write current parameter values. If the STE is acceptable (e.g., does not exceed a predetermined threshold), the selected write current parameter values are saved in the zone table by a saving operation 512. If, however, it is determined that the measured STE is not within an acceptable range, one or more sub-operations of the write current parameter value selection operation 508 may be repeated to identify a 'next best' set of write current parameter values. For example, write error statistics may be examined further to identify the combination of write current parameter values that yields a next-lowest error statistic (e.g., BER) for the select linear density.

After identifying and selecting the next best set of write current parameter values, the measurement and assessment operation 510 again measures STE that occurs when data is written to the selected data tracks according to the next best set of write current parameter values. If the measured STE is acceptable, a saving operation 512 saves the next best set of write current parameter values in the zone table in association with the selected group of data tracks and the selected radial zone.

A determination operation 514 determines whether there are any data tracks remaining in the selected zone that are not yet associated with write current parameter values. If, for example, a series of tracks that will be the IMR track tracks have not yet undergone the operations 506 to 512, these tracks are then selected by the selection operation 504. When optimizing linear density of IMR top tracks per the linear density optimization operation 506, a linear density may be selected according to the same or different criteria than that used to select the linear density for the IMR bottom tracks. Thereafter, the write current parameter selection operation 508 and saving operation 512 are repeated for the IMR top tracks in a manner that is the same or similar to that described above.

The determination operation 514 again determines whether there are any data tracks remaining in the selected zone that are not yet associated with write current parameter values. If not, another determination operation 516 determines if other radial zones remain that have not yet been selected and subjected to the operations of 506 through 512. The selection operation 502 selects another radial zone, and the above-described operations are repeated until write current parameters are saved in association with IMR top data tracks and IMR bottom data tracks in each radial zone.

Figure 6:
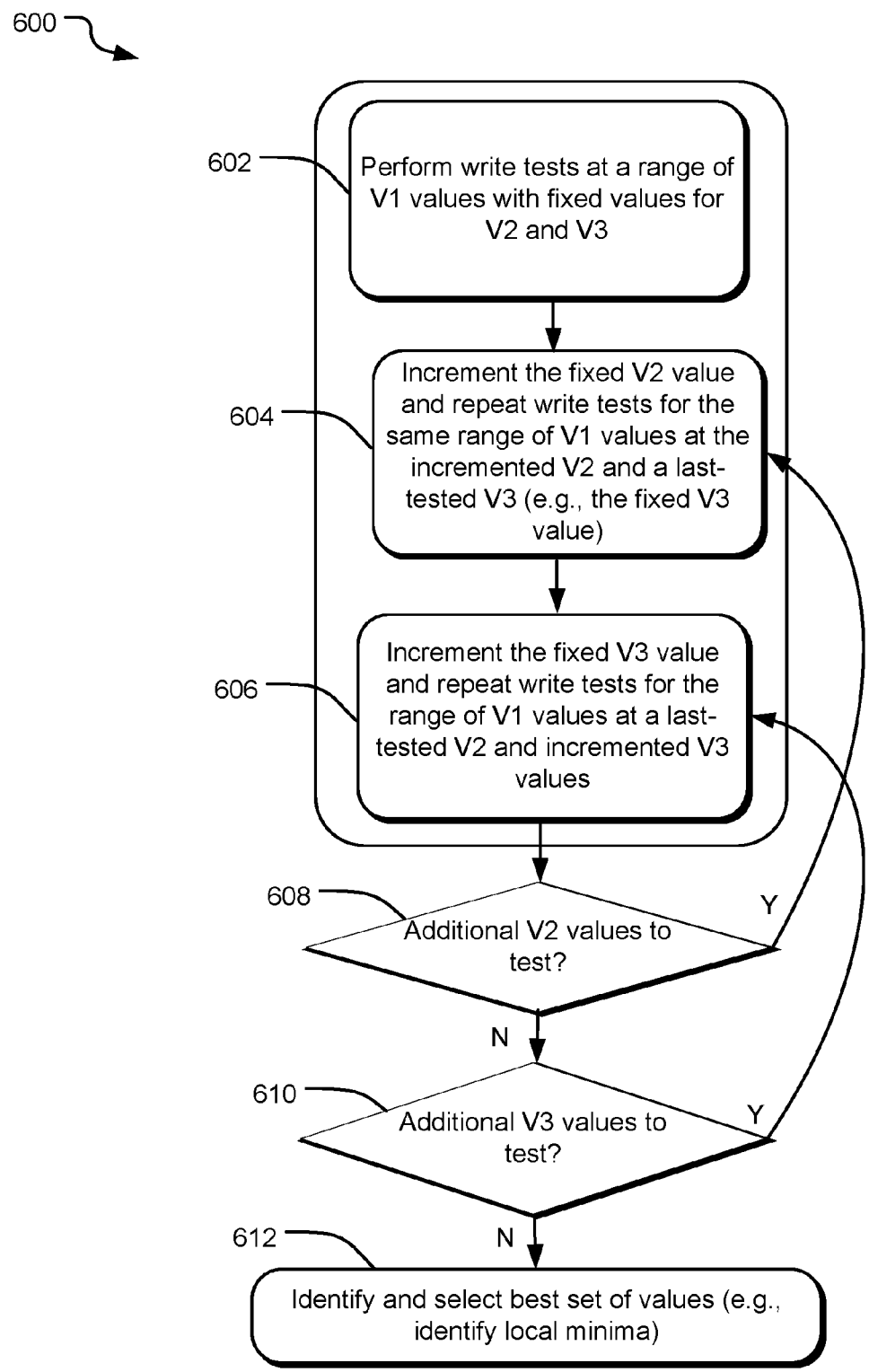
FIG. 6 illustrates example operations for optimizing write current parameter values for data writes at a predetermined linear density.

FIG. 6 illustrates an example operations 600 for write current parameter optimization and selection for individual data tracks or groups of data track, such as IMR top tracks or IMR bottom tracks. During the operations 600, values of different write current parameters are systematically varied and a large multi-dimensional array is populated with write error statistics resulting from data writes according to each of a number of different combinations of write current parameter values. In various implementations, different write current parameters may be optimized in different combinations and orders. In FIG. 6, three write current parameters are systematically varied and optimized relative to one another. These write current parameters, referred to below as merely 'V1, V2, and V3', may each represent any write current parameter. For example, V1 may be a steady state write current value; V2 may be an overshoot amplitude; and V3 may be an overshoot duration. Since the order of write current parameter optimization is variable, any of V1, V2, and V3 can each be interpreted as representing any of the individual write current parameters.

A first write testing operation 602 performs write tests by repeatedly writes data to a data track (or subset of data tracks) at a range of different V1 values with fixed values for V2 and V3. For each of the data writes, write error statistics are recorded. Another write testing operation 604 increments the originally-fixed V2 value and repeats the write tests to the data track(s) for the same range of V1 values at the incremented V2 and a last-tested V3 (e.g., the V3 value originally fixed in the write testing operation 602). Again, write error statistics are recorded for each of the data writes.

Still another write testing operation 606 increments the V3 value for the first time (e.g., from the value fixed in the first write testing operation 602) and repeats the write tests to the data track(s) for the same range of V1 values at the incremented V3 value and at a last-tested V2 (e.g., the incremented V2, as set by the testing operation 604). Write error statistics are recorded for each of the write tests.

A determination operations 608 determines whether there are any additional V2 values that have not yet been tested via the testing operations 604. If so, the testing operation 604 increments the V2 value again and repeats the write tests for the data track(s) for the same range of V1 values and a last-tested V3 (e.g., the V3 incremented by the prior instance of the testing operation 606). Again, the testing operation 606 increments the V3 value and repeats the write tests for the data track(s) for the range of V1 values and the last-tested V2 value (now incremented twice).

The operations 604, 606, and 608 repeat until all V2 values within a predetermined array have been tested. Thereafter, a determination operation 610 determines whether there are any additional V3 values that have not yet been tested via the testing operation 606. If so, the testing operation 606 increments the V3 values again and repeats the write tests for the same range of V1 values and the last-tested V2 value.

When all prospective values for V2 and V3 have been tested (e.g., as defined by predetermined arrays of test values), an identification and selection operation 612 identifies and selects a "best" set of write current parameter values V1, V2, and V3 based on the recorded write error statistics. For example, the "best" set of write current parameter values V1, V2, and V3 may corresponding to a local or absolute minima in the write error statistics. The selected set of write current parameter values are selected and further utilized as previously discussed with respect to FIG. 5 (e.g., operations 510 through 516)

The operations 600 may, in some implementations, optimize a fourth write current parameter (e.g., V4), such as rise time in addition to or in lieu of one or more of steady state write current value, overshoot amplitude, and overshoot duration. Still other implementations optimize fewer than three write current parameters. For example, some implementations may include a single-variable optimization performed by fixing all write current parameters except one select write current parameter and varying the select write current parameter over a range of values while performing test data writes. The value for the write current parameter corresponding to a lowest error statistic (e.g., BER resulting from the write test) is then selected. Still other implementations of the disclosed technology utilize a dual variable optimization by systematically varying two (e.g., rather than three) variables over two respective ranges and observing resulting write error statistics.

Figure 7:
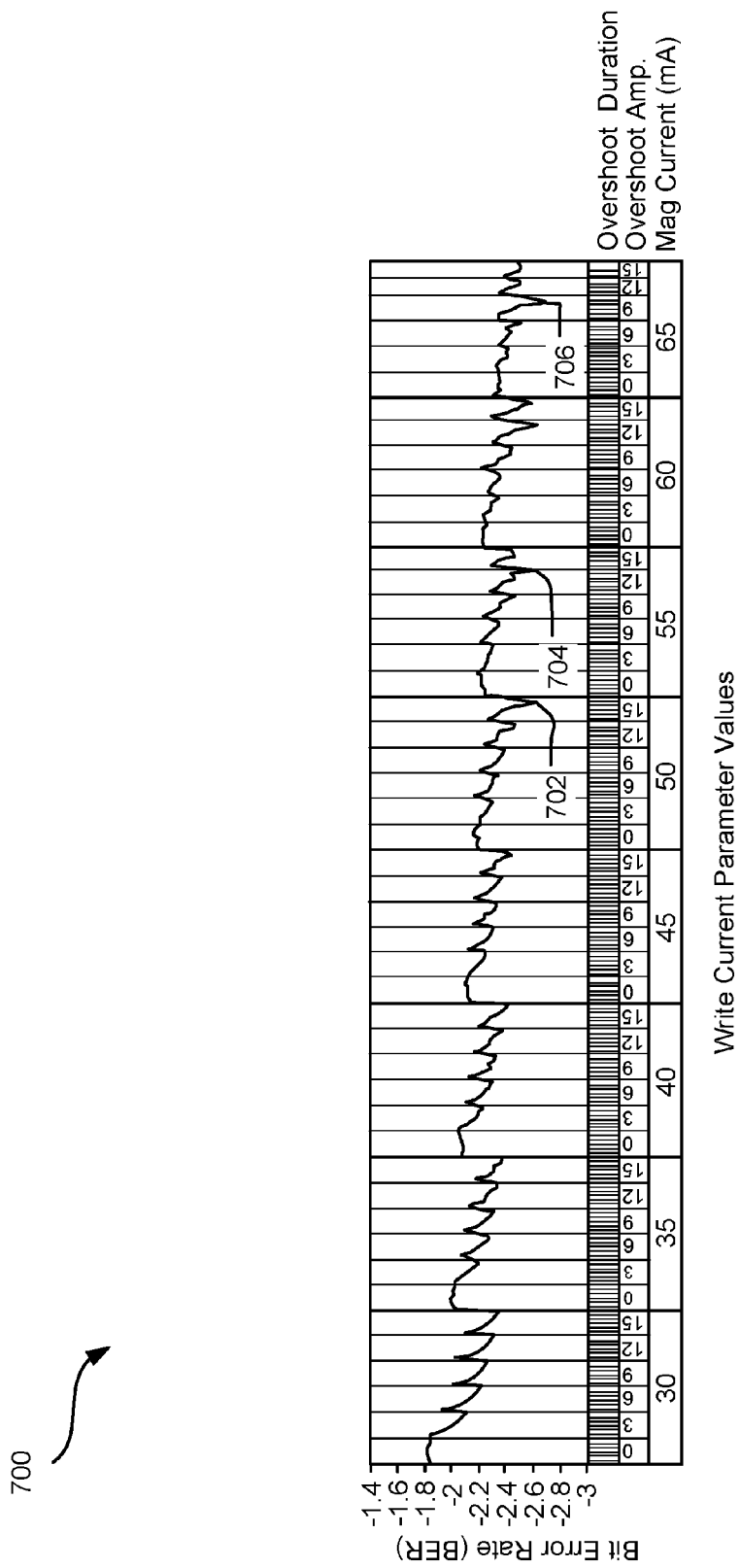
FIG. 7 illustrates a plot illustrating write error statistics observed during a three-dimensional write current parameter optimization process.

FIG. 7 illustrates plot 700 illustrating observed write error statistics recorded during a three-dimensional write current parameter optimization process. In one implementation, the plot 700 is created via the operations 500 described with respect to FIG. 5, which systematically vary three different write current parameter values to identify and select a best resulting "set" of optimized write current parameters for writing data at a select linear density (e.g., a linear density selected to correspond to an IMR top track or an IMR bottom track). In FIG. 7, a horizontal axis represents observed write error statistics (e.g., BER) resulting from write operations performed according to different write current parameter values (e.g., as indicated by three rows of values forming the horizontal axis and corresponding to overshoot duration, overshoot amplitude, and steady state write current ("Mag Current"), respectively). In some implementations, a three-dimensional representation is created to present the same or similar information.

Various minima (e.g., local minima 702, 704, and 706) represent selection candidates for write current parameter values at the select linear density. For example, a set of write current parameter values corresponding to the local minima 702 may initially be selected. If a measured amount of STE is unacceptable when data is written according to these selected write current parameter values, the local minima 702 may be discarded and another local minima 604 may be selected instead (provided the newly selected local minima corresponds to write current parameter values yielding an acceptable level of STE).

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

The invention claimed is:

1. Apparatus comprising:
a storage medium; and
a storage device controller that selectively varies a value of at least one write current parameter to write alternating data tracks of variable written track width on the storage medium.

2. The apparatus of claim 1, wherein the alternating data tracks of variable written track width are written by a same writer.

3. The apparatus of claim 1, wherein the write current parameter is one of write current amplitude, write current overshoot amplitude, write current rise time, and write current overshoot duration.

4. The apparatus of claim 1, wherein the storage device controller generates write current with a first set of values for write current parameters when writing data to a pair of non-adjacent data tracks on the storage medium and generates the write current with a second different set of values for the write current parameters when writing data to a third data track between and directly adjacent to the non-adjacent data tracks.

5. The apparatus of claim 4, wherein generating write current with the first set of values and the second set of values further comprises:
retrieving values for the write current parameters stored in association with a radial zone of the storage medium including the pair of non-adjacent data tracks and the third data track; and
generating write current with the retrieved values.

6. The apparatus of claim 1, wherein the storage device controller is further configured to generate write current with a first set of values of write current parameters when writing data to a first series of alternating data tracks including every other data track in a radial zone and to generate write current with a second set of values of the write current parameters when writing data to a second set of alternating data tracks interlaced with the first set of alternating data tracks.

7. The apparatus of claim 1, wherein the storage device controller is further configured to store the first set of write current parameter values and the second set of write current parameter values in memory of a storage device in association with a radial zone including the pair of non-adjacent data tracks and the third data track.

8. The apparatus of claim 1, wherein the storage device controller is further configured to store a different set of write current parameter values in association with each of a plurality of radial zones on the storage medium.

9. The apparatus of claim 1, wherein the alternating data tracks are written at two different linear densities.

10. A method comprising:
defining a first set of values for write current parameters for use when writing data to a pair of non-adjacent data tracks on a storage medium; and
defining a second different set of values for the write current parameters for use when writing data to a third data track interlaced with the pair of non-adjacent data tracks.

11. The method of claim 10, wherein the first set of values for the write current parameters is defined in association with a first linear density of data and the second set of values for the write current parameters is defined in association with a second linear density of data.

12. The method of claim 10, wherein defining the first set of values or the second set of values further comprises performing a three-dimensional optimization to select steady state write current amplitude, write overshoot amplitude, and write current overshoot duration.

13. The method of claim 10, wherein defining the first set of values for the write current parameters or the second set of values for the write current parameters further comprises:
fixing at least one value of a write current parameter selected from a group consisting of steady state write current amplitude, write current duration, write current rise time, and write current overshoot while writing data with varied values of at least one other write current parameter selected from the group.

14. The method of claim 10, further comprising:
storing the first set of write current parameter values and the second set of write current parameter values in memory of a storage device in association with a radial zone including the pair of non-adjacent data tracks and the third data track.

15. The method of claim 10, wherein the defined first set of values is stored in association with a first set of alternating data tracks including every other data track in a radial zone and the defined second set of values is stored in association with a second set of alternating data tracks interlaced with the first set of alternating data tracks in the radial zone.

16. The method of claim 10, wherein the storage medium is included in a heat-assisted magnetic recording device.

17. The method of claim 10, wherein the storage medium is included in a perpendicular magnetic recording device.

18. One or more tangible computer-readable storage media encoding computer-executable instructions for executing on a computer system a computer process, the computer process comprising:
selectively varying a value of at least one write current parameter to write alternating data tracks of variable written track width with a same writer.

19. The one or more tangible computer-readable storage media of claim 18, wherein the computer process further comprises:
generating write current with a first set of values of write current parameters when writing data to a pair of non-adjacent data tracks on the storage medium; and
generating the write current with a second different set of values of the write current parameters when writing data to a third data track between and directly adjacent to the non-adjacent data tracks.

20. The one or more tangible computer-readable storage media of claim 19, wherein the write current parameters include steady state write current amplitude, overshoot amplitude, rise time, and overshoot duration.

* * * * *